US012770762B2

(12) United States Patent
Li et al.

(10) Patent No.: US 12,770,762 B2
(45) Date of Patent: Oct. 20, 2026

(54) HIGH HOLD CURRENT AND HIGH VOLTAGE ENDURANCE PPTC MATERIAL, DEVICE, AND METHOD OF FABRICATION

(71) Applicant: Dongguan Littelfuse Electronics Company Limited, Dongguan (CN)

(72) Inventors: Qingbei Li, Dongguan (CN); Jianhua Chen, Dongguan (CN); Flory Zhou, Dongguan (CN); Wilson Zheng, Dongguan (CN)

(73) Assignee: Dongguan Littelfuse Electronics Company Limited, Dongguan (CN)

( * ) Notice: Subject to any disclaimer, the term of this patent is extended or adjusted under 35 U.S.C. 154(b) by 457 days.

(21) Appl. No.: 18/498,184

(22) Filed: Oct. 31, 2023

(65) Prior Publication Data

US 2024/0170242 A1 May 23, 2024

(30) Foreign Application Priority Data

Nov. 3, 2022 (CN) ........................ 202211370999.X

(51) Int. Cl.
*H01C 7/02* (2006.01)
*H01H 85/048* (2006.01)

(52) U.S. Cl.
CPC ............. *H01C 7/027* (2013.01); *H01C 7/023* (2013.01); *H01H 2085/0483* (2013.01)

(58) Field of Classification Search
CPC . H01C 7/021; H01C 7/02; H01C 7/12; H01C 17/06533; H01C 17/065; H01C 17/06586; H01C 7/028
See application file for complete search history.

(56) References Cited

U.S. PATENT DOCUMENTS 4,444,671 A * 4/1984 Wiltgen, Jr. ........... H01H 33/76 525/154
6,358,438 B1 * 3/2002 Isozaki ..................... H01C 7/02 252/511
6,620,343 B1 * 9/2003 Blok ......................... H01B 1/24 252/511
2002/0177644 A1 11/2002 Blok
2011/0297891 A1 * 12/2011 Mercx .............. H01C 17/06586 252/511
2021/0313097 A1 * 10/2021 Tsang ...................... H02H 9/026

FOREIGN PATENT DOCUMENTS

CN 112094449 A 12/2020
EP 0834179 * 8/2005 ............. H01C 7/027
KR 20030062117 * 7/2003 ............. C08K 5/005
KR 100453681 A 10/2004

OTHER PUBLICATIONS

KR-20030062117 translation (Year: 2003).*
Extended European Search Report for EP Application No. 23207315.5, dated Jul. 8, 2024, 8 pages.

* cited by examiner

*Primary Examiner* — Kyung S Lee
(74) *Attorney, Agent, or Firm* — KDW Firm, PLLC

(57) ABSTRACT

A polymer positive temperature coefficient (PPTC) material is provided. The PPTC material may include a polymer matrix that defines a PPTC body, and further includes a high temperature polymer. The PPTC material may include a conductive filler component, disposed in the polymer matrix, an arc suppressant, and a high temperature antioxidant, disposed in the polymer matrix.

15 Claims, 4 Drawing Sheets

| Example | CB (vol%) | Antioxidant 1010 (vol%) | Antioxidant 330 (vol%) | Arc suppressant (vol%) | resistivity, ohm*cm | 24V trip endurance | 24V cycle life | 48V trip endurance | 48V cycle life | 60V trip endurance | 60V cycle life |
|---|---|---|---|---|---|---|---|---|---|---|---|
| Comparative Example 1: (PVDF) | 35 | NA | NA | NA | 0.92 | pass, 1000hrs | pass, 1000cycles | all failed after 168hrs | all failed after 100cycle | all failed after 48hrs | all failed after 10cycle |
| Comparative Example 2: ETFE | 36 | NA | NA | NA | 1.55 | pass, 1000hrs | pass, 1000cycles | all failed after 168hrs | all failed after 100cycle | all failed after 48hrs | all failed after 10cycle |
| Comparative Example 3: ETFE | 34 | NA | NA | 10 | 1.74 | pass, 1000hrs | pass, 1000cycles | all failed after 504hrs | all failed after 500cycle | all failed after 336hrs | all failed after 100cycle |
| Example 1: ETFE/added antioxidant | 34 | NA | 0.1 | 10 | 1.69 | NA | NA | pass, 1000hrs | pass, 1000cycles | all failed after 504hrs | all failed after 500cycle |
| Example 2: ETFE/added antioxidant) | 32 | NA | 0.3 | 10 | 1.74 | NA | NA | NA | NA | pass, 1000hrs | pass, 1000cycles |
| Example 3: ETFE/added antioxidant | 28 | NA | 0.6 | 10 | 1.36 | NA | NA | NA | NA | pass, 1000hrs | pass, 1000cycles |
| Example 4: ETFE/added antioxidant) | 28 | NA | 1 | 10 | 1.31 | NA | NA | pass, 1000hrs | pass, 1000cycles | all failed after 336hrs | all failed after 100cycle |
| Example 5: ETFE/added antioxidant | 32 | 0.3 | NA | 10 | 1.72 | NA | NA | pass, 1000hrs | pass, 1000cycles | all failed after 504hrs | all failed after 500cycle |
| Example 6: ETFE/added antioxidant) | 31 | 0.6 | NA | 10 | 1.88 | NA | NA | pass, 1000hrs | pass, 1000cycles | all failed after 504hrs | all failed after 500cycle |

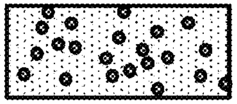

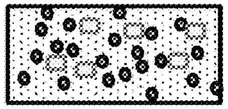

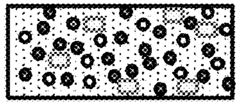

*FIG. 2*

HIGH HOLD CURRENT AND HIGH VOLTAGE ENDURANCE PPTC MATERIAL, DEVICE, AND METHOD OF FABRICATION

CROSS-REFERENCE TO CORRESPONDING APPLICATIONS

This application claims the benefit of priority to, Chinese Patent Application No. 202211370999.X, filed Nov. 3, 2022, entitled "HIGH HOLD CURRENT AND HIGH VOLTAGE ENDURANCE PPTC MATERIAL, DEVICE, AND METHOD OF FABRICATION," which application is incorporated herein by reference in its entirety.

BACKGROUND

Field

Embodiments relate to the field of circuit protection devices, including fuse devices.

Discussion of Related Art

Positive temperature coefficient (PTC) devices may be used as overcurrent or over-temperature protection device, as well as current or temperature sensors, among various applications.

Various criteria used to evaluate devices containing PPTC materials include the trip temperature, the hold current, especially at high temperature, as well as stability at high voltage, including endurance and cycling tests.

PPTC devices may be used in electric vehicle circuits, and may need to operate properly over a range of voltages, such as up to 48 V or higher for overvoltage protection ranges. Current PPTC materials that are targeted for high temperature operation (>100° C.) may use polyvinylidene fluoride (PVDF) as the polymer matrix material. One drawback of these materials is that such PPTC devices do not meet the requirement of 1 ampere (A) hold current for 48 V applications. This issue places restrictions on the use of such materials in EV applications that may require up to 48 V or higher volt performance for PPTC devices to ensure safe performance of electric vehicles.

With respect to this and other considerations the present disclosure is provided.

BRIEF SUMMARY

In one embodiment, a polymer positive temperature coefficient (PPTC) material is provided. The PPTC material may include a polymer matrix that defines a PPTC body, and further includes a high temperature polymer. The PPTC material may include a conductive filler component, disposed in the polymer matrix, and a high temperature antioxidant, and an arc suppressant, disposed in the polymer matrix.

In another embodiment, a PPTC device may include a first electrode; a second electrode, opposing the first electrode; and a polymer positive temperature coefficient (PPTC) material, disposed between the first electrode and the second electrode. The PPTC material may include a polymer matrix, the polymer matrix defining a PPTC body, and further comprising a high temperature polymer, a conductive filler component, disposed in the polymer matrix, an arc suppressant, and a high temperature antioxidant, disposed in the polymer matrix.

In a further embodiment, a method of fabricating a PPTC device is provided. The method may include providing a polymer matrix that defines a PPTC body, and further comprises a high temperature polymer. The method may include mixing a conductive filler component in the polymer matrix, mixing an arc suppressant, and mixing a high temperature antioxidant in the polymer matrix.

BRIEF DESCRIPTION OF THE DRAWINGS

FIG. 2 illustrates a comparison of the electrical performance for different PPTC device systems;

DESCRIPTION OF EMBODIMENTS

Figure 1B:
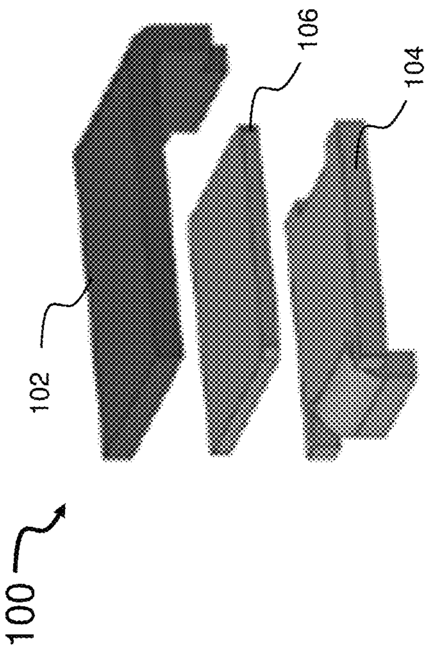
FIG. 1B illustrates the PPTC device of FIG. 1A in exploded form.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, novel PPTC materials are provided for forming a PPTC device, where the PPTC device is configured to operate at relatively higher temperatures and higher voltage, such as 60 V. In various embodiments, a novel PPTC material is provided having a high temperature polymer matrix, conductive filler and high temperature antioxidant, disposed in the polymer matrix. As such, the PPTC materials and devices of the present embodiments may be especially suitable for operation in electric vehicles, for one application, where a high hold current at high-temperature and high voltage endurance PPTC material is required.

Figure 1A:
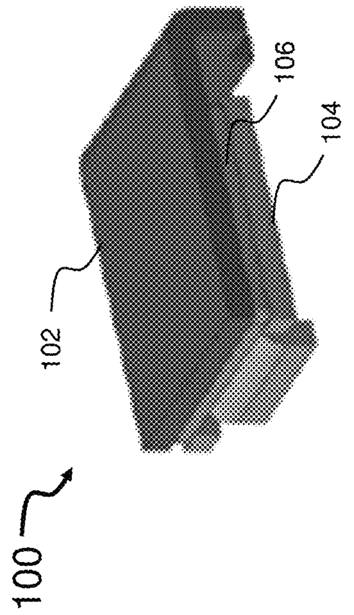
FIG. 1A illustrates a PPTC device in assembled form according to embodiments of the disclosure.
Figure 1C:
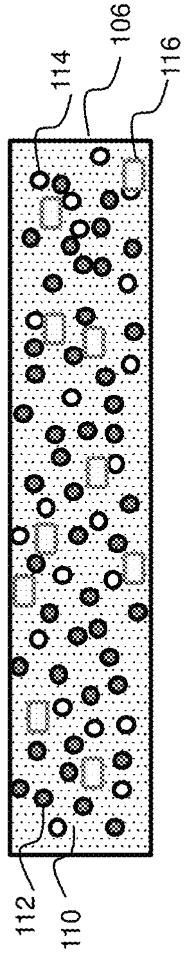
FIG. 1C shows a close up of a portion of the PPTC device of FIG. 1A.

FIG. 1A illustrates a PPTC device 100 in assembled form according to embodiments of the disclosure, while FIG. 1B illustrates the PPTC device 100 of FIG. 1A in exploded form, and FIG. 1C shows a close up of a portion of the PPTC device 100. In this embodiment, a PPTC material, shown as PPTC body 106, is disposed between a first electrode 102 and a second electrode 104. The PPTC body 106 includes a polymer matrix 110 that is formed of a high temperature polymer. As used herein, a 'high temperature polymer' may refer to a polymer having a melting temperature above approximately 200° C. In various non-limiting embodiments, the polymer matrix 110 may include fluorinated polymers, polyester, polyamide, polyimide, or polycarbonate. In various embodiments, the melting point of the polymer matrix is 210° C. to 270° C. In particular embodiments, the polymer matrix 110 may be formed of ethylene tetrafluoroethylene, where the melting temperature may be between approximately 220° C. to 270° C. depending upon the exact formulation.

As shown in FIG. 1C, a conductive filler component 112 may be disposed within the polymer matrix 110. In various non-limiting embodiments, the conductive filler may be a carbon material, graphene, carbon nanotubes, tungsten carbide, metal particles, or combination thereof. In some non-limiting embodiments, the conductive filler component 112 may form a volume fraction of 25% to 38%.

In addition, a high temperature antioxidant 114, may also be disposed within the polymer matrix 110. As used herein, a 'high temperature antioxidant' may refer to an antioxidant having a melting temperature above approximately 200° C. In some embodiments, the high temperature antioxidant 114 may have a melting temperature of at least 230° C. In some non-limiting embodiments, the high temperature antioxidant may be antioxidant 1024, 3114, 330 (the use herein of numbers after the term "antioxidant" (such as antioxidant 330, antioxidant 1010) may refer to specific antioxidant materials compositions that may be represented by chemical formula, or structural figures, for example, as known in the art). In particular embodiments that employ antioxidant 330 as the high temperature antioxidant 114, the high temperature antioxidant content may be 0.1% to 2% by volume, and more particularly, may range from 0.2 to 0.6% by volume.

In accordance with the present embodiments, the advantages of a PPTC body, such as PPTC body 106, include improved electrical performance under relatively higher temperature and higher voltage conditions, as detailed with respect to the figures to follow. In particular embodiments, the high temperature antioxidant 114 may be an antioxidant 330 system. This material may be alternately represented by the formula 1,3,5-Trimethyl-2,4,6-tris(3,5-di-tert-butyl-4-hydroxybenzyl)benzene. One structural representation of this composition is shown below:

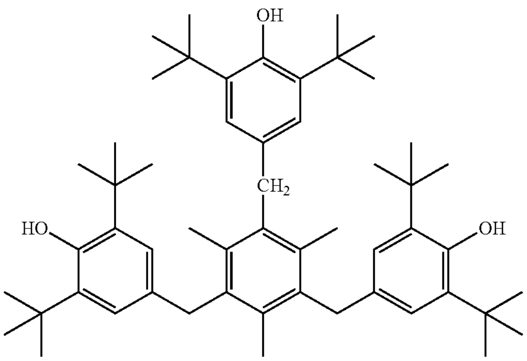 [SMILES: Cc1c(Cc2cc(C(C)(C)C)c(O)c(C(C)(C)C)c2)c(C)c(Cc2cc(C(C)(C)C)c(O)c(C(C)(C)C)c2)c(C)c1Cc1cc(C(C)(C)C)c(O)c(C(C)(C)C)c1]

Note that in the embodiment of FIG. 1C, an arc suppressant 116 may be included in the polymer matrix 110, and in particular embodiments the arc suppressant 116 may form a volume fraction of 5% to 20% of the PPTC body 106. Non-limiting examples of suitable material for arc suppressant 116 include magnesium hydroxide, zinc oxide, and calcium carbonate. In particular examples, magnesium hydroxide may be used as arc suppressant 116. One role of the arc suppressant may be to improve voltage resistance, where various electrical properties of the PPTC materials of the present embodiments are detailed below.

FIG. 2 illustrates a comparison of the electrical performance of different PPTC materials. In particular, FIG. 2 includes tabular information listing the composition of different PPTC materials, as well as the electrical results for various tests performed on samples fabricated from the different PPTC materials. Generally, the results for three different general types of materials are shown, as represented by the illustrations to the right of the table. The first two compositions, comparative examples 1-2, listed in the first two rows, correspond to PPTC materials formed with approximately 35-36% carbon black dispersed in a polymer matrix, either polyvinylidene fluoride (PVDF) or ethylene-tetrafluoroethylene (ETFE).

The third composition, comparative example 3, listed in the third row, corresponds to a PPTC material formed with 34% carbon black dispersed in an ETFE matrix, with 10% by volume arc suppressant. All the other compositions, correspond to compositions arranged according to the present embodiments, with an ETFE polymer matrix, a conductive filler (~30% carbon black), an arc suppressant, and high temperature antioxidant (antioxidant 330), except that the last two rows provide examples with relatively lower temperature antioxidant (1010).

Note that, while not listed, all the samples in FIG. 2 meet the hold current request 1 A@105° C. The results that are shown in FIG. 2 illustrate that samples without arc suppressant and without antioxidant, while showing satisfactory performance at 24 V, generally fail trip endurance and cycle life at 48V and 60 V, after short duration (<168 hrs) or small number of cycles (<100 cycles). The sample having just arc suppressant, but no antioxidant shows some improvement, with failure at 504 hours and 500 cycles for trip endurance and cycle life, respectively, at 48 V. At 60 V for this sample the failure corresponds to 336 hours and 100 cycles for trip endurance and cycle life, respectively.

Turning to the data for PPTC materials arranged to the present embodiments (Examples 1-4), there are shown four different compositions, all arranged with ETFE polymer matrix, with 28%-34% carbon black filler and 10% by volume arc suppressant. The volume fraction of antioxidant 330 is varied between the samples, from 0.1% to 1%. In this case, the samples having 0.1% antioxidant 330 and 1% antioxidant 330 all passed the 1000 hr trip endurance and 1000 cycles cycle life tests, at 48 V, demonstrating the effectiveness of the addition of small amounts of antioxidant 330 in improving 48 V performance, in comparison to comparative sample 3, which sample has not added antioxidant. At 60 V, the Example 1, with 0.1% added antioxidant 330, also exhibited better trip endurance (504 hours failure) and better cycle life (500 cycle failure) as compared to comparative sample 3. At 60 V, the Example 4, with 1% added antioxidant 330, exhibited similar trip endurance (336 hours failure) and similar cycle life (100 cycle failure) as compared to comparative sample 3.

Turning to example 2 and example 3, each sample composition includes an ETFE polymer matrix with carbon black added, with 10% by volume arc suppressant, and 0.3% and 0.6% added antioxidant 330, respectively. These samples were measured just at 60 V. The results show superior performance with passing at 1000 hours and 1000 cycles for trip endurance and cycle life, respectively.

In the examples 5 and 6, the PPTC samples use an overall formulation corresponding to that of examples 2 and 3 respectively. In particular, an ETFE matrix is used with similar volume percent carbon black (~32%), 10% by volume arc suppressant. In addition the examples 5 and 6 use 0.3% by volume and 0.6% by volume antioxidant. However, in these two examples, the antioxidant added to the polymer matrix is antioxidant 1010. The electrical tests were performed for these samples at 48V and 60 V, and, similar to examples 1 and 4, at 48 V the examples 5 and 6 passed 1000 hours trip endurance and 1000 cycles cycle life test. At 60 V, similar to example 1, the example 5 and example 6 all failed at 504 hours trip endurance and 500 cycles cycle life test.

In summary, PPTC materials based upon a high temperature polymer (ETFE) with arc suppressant and added high temperature antioxidant (330) exhibit superior electrical performance at 48 V and 60 V, for small volumes of antioxidant (0.1%~1%). While PPTC samples arranged with high temperature polymer (ETFE), arc suppressant and relatively lower temperature antioxidant (1010) exhibit superior electrical performance at 48 V and 60 V compared to PPTC materials based upon ETFE, arc suppressant without added antioxidant, these low-temperature-antioxidant PPTC samples do not perform as well at 60 V as compared to PPTC materials with ETFE matrix and high temperature antioxidant (330) of similar volume fraction.

Without limitation to any particular theory, one factor, among possible others, for why the PPTC composition with added arc suppressant and added antioxidant 330 may have such superior properties is the ability to retain antioxidant within the PPTC body for use under actual device operation conditions. Note that in order to fabricate a PPTC device, a polymer matrix, conductive filler, high temperature antioxidant, and arc suppressant are mixed into a mixing apparatus and the mixture is then kneaded at a working temperature (about 280° C. to 300° C.), which temperature is above the melting temperature of the polymer matrix. The mixing apparatus may be an internal mixer, open mill, single screw extruder or twin screw extruder, for example. Then the melt-mixed polymer is extruded into a sheet by extrusion molding. The final product will be fabricated with two metal foils that form a sandwich where the metal foils are separated by a layer of the PTC conductive composite material. Thus, during this processing, the PPTC material will experience temperatures that may exceed the melting temperature of the antioxidant. However, because the antioxidant 330 has a relatively higher melting temperature (~240° C.), the antioxidant 330 will be relatively less volatile than lower temperature antioxidants during extrusion at temperatures in the range of 280° C.-300° C., and will be stable against a long term trip endurance test at elevated temperatures, where the trip temperature for the high temperature polymer matrix material may be in the range of 210° C. to 270° C. As such, relatively less, if any, of the antioxidant 330 will be lost to volatilization during preparation of the PPTC body 106 and will be stable against trip endurance tests, such that the antioxidant 330 will be present in the desired amount during actual operation at lower temperatures, providing superior electrical performance as shown in the results of FIG. 2.

Figure 3:
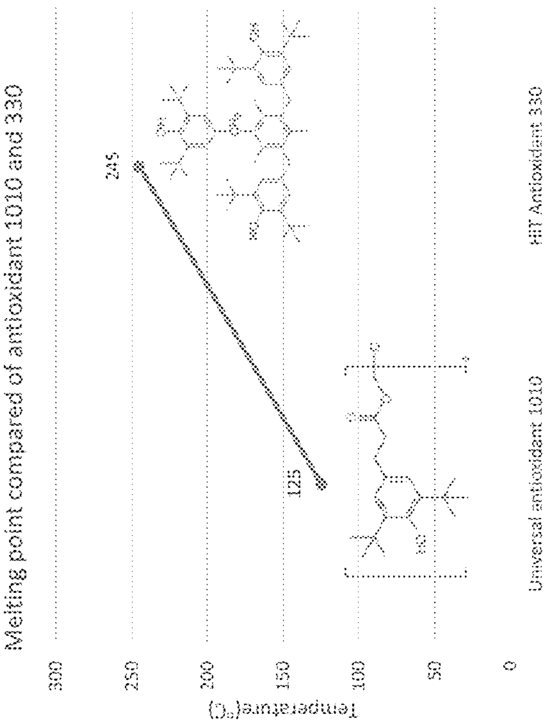
FIG. 3 illustrates melting temperature for different antioxidant materials.
Figure 4:
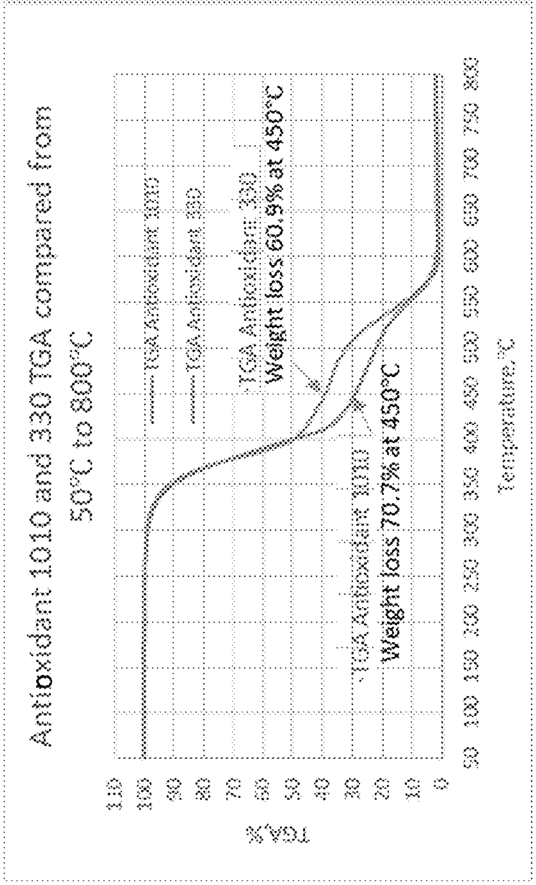
FIG. 4 and FIG. 5 illustrate the results of thermogravimetric analysis of two different antioxidants.
Figure 5:
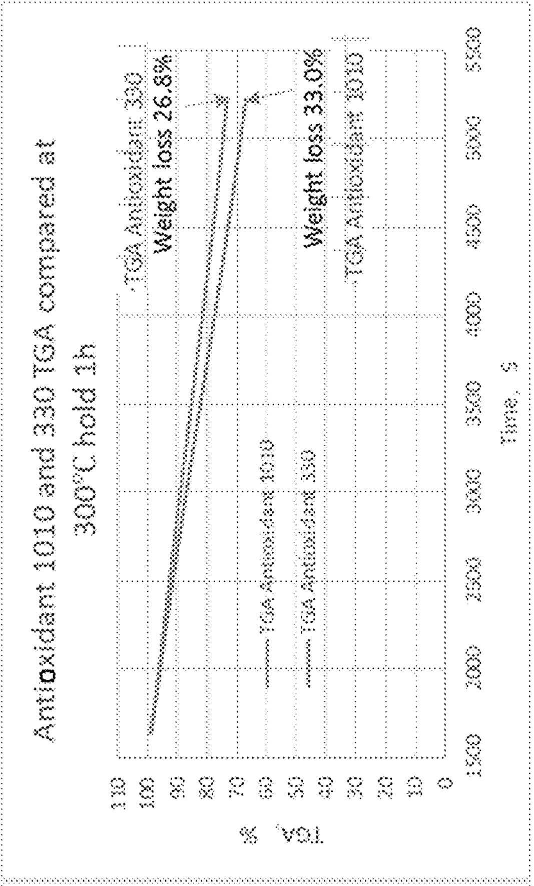

To support this hypothesis, FIG. 3 illustrates the relative melting temperatures of antioxidant 1010 (125° C.) and antioxidant 330 (245° C.), while FIGS. 4 and 5 illustrate the results of thermogravimetric (TGA) analysis of antioxidant 330 and antioxidant 1010 under an atmosphere of air. In FIG. 4, a constant temperature ramp TGA was performed to increase the sample temperature between 50° C. and 800° C. As illustrated, both antioxidants lose weight rapidly above 350° C. However, at 450° C., the antioxidant 1010 has lost 10% more weight (70.7% loss) than the antioxidant 330 (60.9% loss), showing the greater volatility of antioxidant 1010 at high temperatures. In FIG. 5, a constant temperature experiment is conducted, where the samples are held at 300° C., which temperature is in the range of actual fabrication temperatures, discussed above. In this example, the antioxidant 1010 has lost substantially more weight at one hour's duration than antioxidant 330.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A polymer positive temperature coefficient (PPTC) material, comprising: a polymer matrix, the polymer matrix defining a PPTC body, and further comprising a high temperature polymer, wherein the high temperature polymer comprises ethylene-tetrafluoroethylene (ETFE);

a conductive filler component, disposed in the polymer matrix;

an arc suppressant; and a high temperature antioxidant, disposed in the polymer matrix, wherein the high temperature antioxidant comprises 0.3% to 0.6% by volume of the PPTC body.

2. The PPTC material of claim 1, wherein the high temperature antioxidant has a melting temperature of at least 200° C.

3. The PPTC material of claim 2, wherein the high temperature antioxidant comprises an antioxidant 330.

4. The PPTC material of claim 2, wherein the high temperature antioxidant comprises 1,3,5-Trimethyl-2,4,6-tris(3,5-di-tert-butyl-4-hydroxybenzyl)benzene.

5. The PPTC material of claim 1, wherein the PPTC material is effective to support 1A hold current at 60 V, 105° C. temperature.

6. The PPTC material of claim 1, wherein the PPTC material is effective to pass 1000 hrs 60 V trip endurance test.

7. The PPTC material of claim 1, wherein the PPTC material is effective to pass 1000 cycles at 60 V, cycle life test.

8. A PPTC device, comprising:

a first electrode;

a second electrode, opposing the first electrode; and a polymer positive temperature coefficient (PPTC) material, disposed between the first electrode and the second electrode, the PPTC material comprising:

a polymer matrix, the polymer matrix defining a PPTC body, and further comprising a high temperature polymer, wherein the high temperature polymer comprises ethylene-tetrafluoroethylene (ETFE);

a conductive filler component, disposed in the polymer matrix;

an arc suppressant; and a high temperature antioxidant, disposed in the polymer matrix, wherein the high temperature antioxidant comprises 0.3% to 0.6% by volume of the PPTC body.

9. The PPTC device of claim 8, wherein the high temperature antioxidant has a melting temperature of at least 200° C.

10. The PPTC device of claim 9, wherein the high temperature antioxidant comprises 1,3,5-Trimethyl-2,4,6-tris(3,5-di-tert-butyl-4-hydroxybenzyl)benzene.

11. The PPTC device of claim 8, wherein the PPTC material is effective to support 1A hold current at 60 V, 105° C.

12. The PPTC device of claim 8, wherein the PPTC device is effective to pass 1000 hrs 60V trip endurance test and 1000 cycles 60 V cycle life test.

13. A method of fabricating a PPTC device, comprising:

providing a polymer matrix, the polymer matrix defining a PPTC body, and further comprising a high temperature polymer, wherein the high temperature polymer comprises ethylene-tetrafluoroethylene (ETFE);

mixing a conductive filler component, in the polymer matrix;

mixing an arc suppressant in the polymer matrix; and mixing a high temperature antioxidant in the polymer matrix, wherein the high temperature antioxidant comprises 0.3% to 0.6% by volume of the PPTC body.

14. The method of claim 13, wherein the high temperature antioxidant has a melting temperature of at least 200° C.

15. The method of claim 14, wherein the high temperature antioxidant comprises 1,3,5-Trimethyl-2,4,6-tris(3,5-di-tert-butyl-4-hydroxybenzyl)benzene.

* * * * *